United States Patent [19]
Tallon

[11] 4,436,998
[45] * Mar. 13, 1984

[54] HELIUM LEAKAGE DETECTOR

[75] Inventor: Jacques Tallon, Annecy, France

[73] Assignee: Compagnie Industrielle des Telecommunications, Paris, France

[*] Notice: The portion of the term of this patent subsequent to Dec. 21, 1999 has been disclaimed.

[21] Appl. No.: 451,691

[22] Filed: Dec. 20, 1982

Related U.S. Application Data

[62] Division of Ser. No. 233,236, Feb. 10, 1981, Pat. No. 4,365,158.

[30] Foreign Application Priority Data

Feb. 11, 1980 [FR] France ................................ 80 02923

[51] Int. Cl.³ ............................................. B01D 59/44
[52] U.S. Cl. ...................................... 250/288; 73/40.7
[58] Field of Search ........................... 250/288; 73/40.7

[56] References Cited

U.S. PATENT DOCUMENTS

| | | | |
|---|---|---|---|
| 3,342,990 | 9/1967 | Barrington et al. | 250/288 |
| 3,842,266 | 10/1974 | Thomas | 250/288 |
| 3,968,675 | 7/1976 | Briggs | 250/288 |
| 4,365,158 | 12/1982 | Tallon | 250/288 |

*Primary Examiner*—Bruce C. Anderson
*Attorney, Agent, or Firm*—Sughrue, Mion, Zinn, Macpeak & Seas

[57] ABSTRACT

The invention relates to a helium leakage detector. It includes a measuring spectrometric cell (8) disposed in parallel with a molecular diffusion pump (6) whose outlet (7) is short-circuited at the inlet (5) by a pipe (10) upstream from a constriction (11) constituted by an adjustable valve.

3 Claims, 1 Drawing Figure

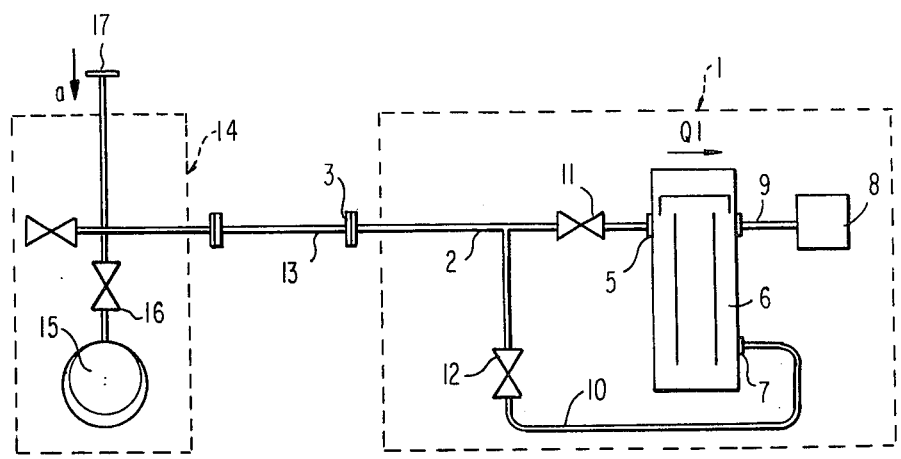

HELIUM LEAKAGE DETECTOR

This is a division of application Ser. No. 233,236, filed Feb. 10, 1981, now U.S. Pat. No. 4,365,158.

The invention relates to a helium leakage detector having a mass spectrometer.

BACKGROUND OF THE INVENTION

Such apparatus includes a spectrometric cell for observing and measuring the quantity of helium molecules which successively pass through a vapour trap (which is generally of the liquid nitrogen type), a diffusion pump and a vane pump.

Its disadvantage is that it is complicated and therefore expensive, while its high level of performance is not always essential.

SUMMARY OF THE INVENTION

The invention provides a helium detector which includes a simplified mass spectrometer at reasonable cost price.

More precisely the present invention provides a helium leakage detector having a mass spectrometer, wherein said spectrometer includes a measuring spectrometric cell disposed in parallel with a molecule diffusion pump whose outlet is short-circuited at the inlet by a pipe upstream from a constriction, which may advantageously be constituted by an adjustable valve.

The detector may also include a draw-off valve at the inlet of the diffusion pump and a measuring valve on the short-circuit pipe.

The detector may further include a trap between the diffusion pump and the spectrometric cell.

Another trap may be inserted between the draw-off valve and the inlet of the diffusion pump.

BRIEF DESCRIPTION OF THE DRAWING

The single FIGURE of the accompanying drawing schematically illustrates a helium leakage detector in accordance with the invention.

DETAILED DESCRIPTION

A leakage detector assembly 1 has an inlet pipe 2 and an inlet flange 3.

The inlet pipe 2 communicates with an inlet 5 of a diffusion pump via a diaphragm or constriction which can be constituted by an adjustable draw-off valve 11. A spectrometric measuring cell 8 is connected to the diffusion pump 6 via a pipe 9.

Further, the outlet 7 of the diffusion pump 6 is connected by a pipe 10 and a measuring valve 12 to a connection point between the flange 3 and valve 11 on the pipe 2.

During use, the inlet flange 3 of the detector 1 is connected by a pipe 13 to an auxiliary pumping unit 14 which includes a vane pump 15 with an isolating valve 16 and a flange 17 for connecting to an installation (not shown) which is to be tested.

Operation is as follows. In this apparatus, a helium flux Q which comes from the installation could give a helium flux $Q1=nQ$ in the looped circuit of the spectrometer, where $n>1$. The ratio n is related to the pumping speeds at the inlet of the spectrometer 8 and of the auxiliary pump of this unit. The apparatus is therefore a flux amplifier apparatus.

In conventional apparatus, where the outlet pipe 7 of the diffusion pump 6 is connected to an auxiliary vane pump, in the circuit of the spectrometer, the helium flux Q which enters the installation gives a smaller flux $q=Q/n$ where $n>1$, n also being a function of the pumping speeds at the inlet of the spectrometer and at the inlet of the auxiliary pump.

With this apparatus, gas can be drawn from the inlet circuit and maintained from some time for measuring purposes. Indeed, the flux Q1 circulates at a constant value in the circuit of the closed loop of the diffusion pump 6. It is possible to obtain the reading of the flux Q entering the installation by closing the valve 12 on the pipe 10. The flux is then measured by closing the valve 12 and the isolating valve of the auxiliary pump 15 after the flux Q1 has been established. The flux Q thus flows from the inlet 3 to the outlet 7 of the diffusion pump 6 closed by the valve 12. Helium accumulates in the volume situated between the outlet 7 and the valve 12. This is not a drawback since the diffusion pump prevents helium from being diffused back towards the spectrometric cell 8.

Another advantage of this apparatus is that a detector without a vane pump and without an extra connecting flange for such a vane pump can be formed.

In a variant, if it is necessary to protect the spectrometric cell 8, some kind of trap can be inserted between the diffusion pump 6 and the cell 8. The trap may be of the liquid nitrogen, ion or, even, zeolite type, for example.

Further, to improve pumping, it is also possible to place a trap between the draw-off valve 11 and the inlet 5 of the diffusion pump 6.

I claim:

1. In a helium leakage detector having no vane pump, and including a molecular diffusion pump (6) having an inlet (5) and outlet (7), and a measuring spectrometric cell connected in a branch circuit from said diffusion pump, wherein the improvement comprises a bypass conduit connecting said outlet (7) to an inlet connection to a structure to be tested, and restriction means connected between said inlet (5) of said diffusion pump (6) and said inlet connection to said structure to be tested, whereby the necessity of using a vane pump is avoided, allowing a recirculating loop of gas to be maintained within the system for some period of time for measuring purposes.

2. The detector according to claim 1, wherein said restriction means comprises an adjustable valve.

3. The detector according to claim 1, further comprising a measuring valve disposed in said bypass conduit.